(No Model.) 3 Sheets—Sheet 1.
G. T. PILLINGS.
CAN SOLDERING MACHINE.
No. 288,481. Patented Nov. 13, 1883.
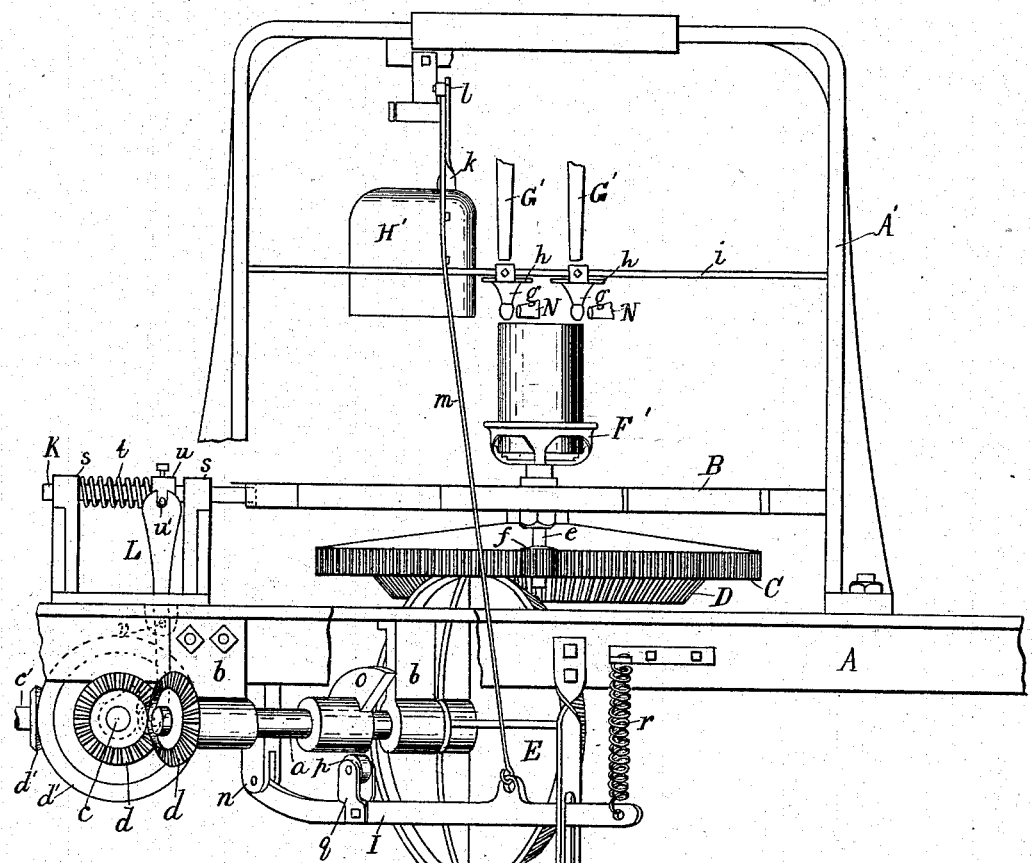
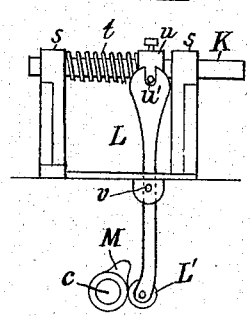
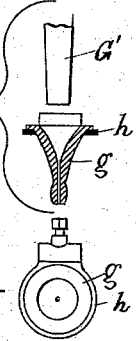
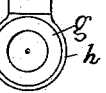
WITNESSES
Danl. Fisher
Edw. J. Riggs
INVENTOR
George T. Pillings
by G. H. & H. T. Howard
Attys (No Model.)
3 Sheets—Sheet 2.
G. T. PILLINGS.
CAN SOLDERING MACHINE.
No. 288,481. Patented Nov. 13, 1883.
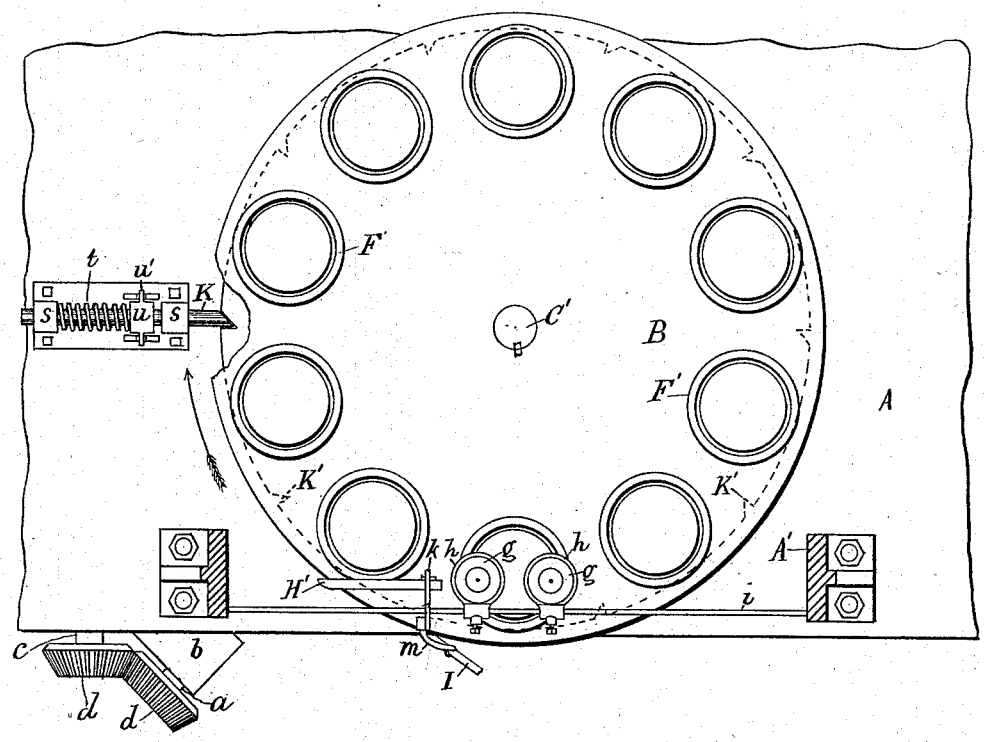
WITNESSES
INVENTOR (No Model.)
G. T. PILLINGS.
CAN SOLDERING MACHINE.
No. 288,481. Patented Nov. 13, 1883.
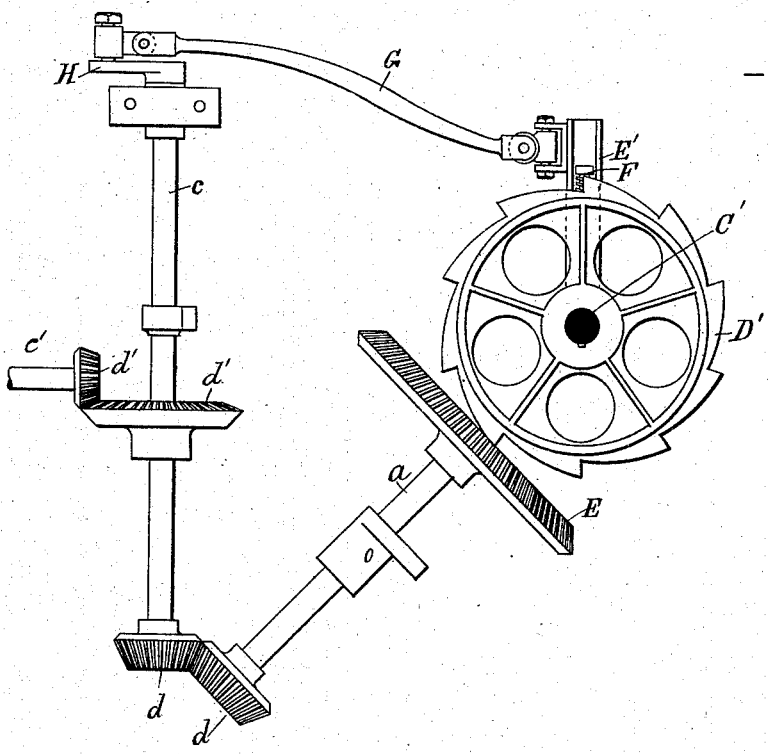
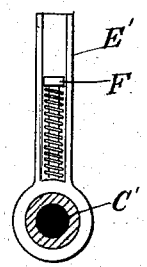
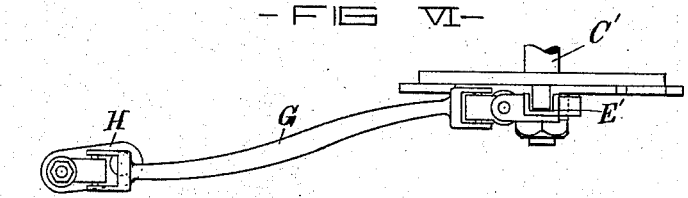

UNITED STATES PATENT OFFICE.

GEORGE T. PILLINGS, OF BALTIMORE, MARYLAND.

CAN-SOLDERING MACHINE.

SPECIFICATION forming part of Letters Patent No. 288,481, dated November 13, 1883.

Application filed April 13, 1883. (No model.)

*To all whom it may concern:*

Be it known that I, GEORGE T. PILLINGS, of the city of Baltimore, and State of Maryland, have invented certain Improvements in Can-Soldering Machines, of which the following is a specification.

This invention relates to certain improvements in that class of can-making machines in which a series of cans supported on disks are revolved on their axes independently of a revoluble table, near the circumference of which the said disks are located, and in which the solder is applied to the revolving cans through solder-conducting tubes which are heated by gas-flames.

The first part of my invention consists in an automatically-operating fan to extinguish flame from burning rosin and oil, which are applied as a flux to the can in the soldering operation, and which become ignited by the gas-jets employed to melt the solder.

The second part of my invention consists in combining with the solder - conducting tubes detached self - adjusting and yielding nipples, upon which the gas-flames play to carry solder in a melted condition to the can-heads.

In the further description of my said invention which follows reference is made to the accompanying drawings, forming a part hereof, and in which—

Figure I is an exterior side view of certain parts of a can-soldering machine embodying my present improvements. Fig. II is a plan of Fig. I with certain parts thereof removed. Fig. III is a view of parts of the invention. Fig. IV is a plan of the mechanism for revolving the table. Figs. V and VI are views of portions of the mechanism shown in Fig. IV. Figs. VII and VIII are details of the invention on an enlarged scale.

Similar letters of reference indicate similar parts in all the views.

A and A' represent parts of the frame of a can-soldering machine, which frame may be of any suitable construction, as it forms no part of my present improvements.

B is a circular table adapted for revolution in a horizontal plane above the part A of the frame.

C is a spur-gear, which runs loosely on the spindle C', which supports the table B.

D is a beveled gear cast with or secured to the spur-gear C, and it also is loose on the spindle C'.

E is a beveled pinion, which engages with the beveled gear D, and it is secured to a shaft, $a$, supported in suitable bearings, $b$. The shaft $a$ receives its motion from a shaft, $c$, through the medium of the beveled gears $d$, and the shaft $c$ receives its movement from the driving-shaft $c'$ by means of the beveled gears $d'$.

The table B is keyed to the central spindle, C', and rotated intermittingly through the medium of a ratchet-wheel, D', also keyed to the spindle C', a vibratory arm, E', placed loosely on the spindle C', a spring-pawl, F, a rod, G, and a crank, H, which revolves with the shaft $c$. The ratchet-wheel D', having as many teeth—in the present case ten—as there are can-seats, is moved one-tenth of a revolution at each complete revolution of the shaft $c$, and this movement is sufficient to bring the cans successively under the soldering devices hereinafter described.

F' F' are can-seats secured to the upper end of small spindles $e$, which at their lower end have a pinion, $f$, in gear with the spur-wheel C.

G' G' are solder-conducting tubes terminating directly above nipples $g$. These nipples, which are shown on an enlarged scale in Fig. VII, rest loosely in rings $h$, suspended from a rod, $i$, supported by the part A' of the frame.

H' is a fan attached to the end of a lever, $k$, having its fulcrum at $l$. The end of the lever $k$ is connected by means of a rod, $m$, to an arm, I, pivoted to a lug, $n$, projecting below and from the portion A of the frame. The lever I is forced down at each revolution of the shaft $a$ by means of a cam, $o$, which in its revolution comes in contact with the roller $p$, pivoted to a lug, $q$, on the arm I. The upward movement of the arm I is effected by the contraction of a spiral spring, $r$, which is extended in the downward movement of the said arm, just alluded to.

K is a bolt with a chisel-point, supported in bearings $s$ on the upper surface of the part A of the frame and exteriorly of the table B, which table has notches K' in its periphery corresponding in shape with the end of the said bolt—that is to say, the notches have one side in practically a radial line. The number of notches K' corresponds with that of the can-seats F', and as a can-seat is brought under the soldering devices the bolt K enters a notch K' and prevents the seat and the can held thereon from passing the proper point by reason of the momentum of the table.

Tables heretofore used in can-machines have been provided with V-grooves, and a bolt or similar device to enter them to effect a positive movement of the table; but such notches have invariably had two beveled or inclined edges with reference to a radial line, and the momentum of the table in such machines has a tendency to force back the bolt and allow the table to move slightly past the desired point of stoppage. This difficulty is obviated in my invention by the chisel formation of the bolt and the corresponding shape of the notches, (see Fig. II,) as the radial side of the notch, in the revolution of the table in the direction indicated by the arrow, comes in contact with a flat side, a radial line of the bolt K. The bolt K is forced in contact with the periphery of the table B, and to the notches therein, by means of a spiral spring, $t$, confined between one of the bearings $s$ and an adjustable collar, $u$, on the bolt.

L is a lever, pivoted to the part A of the frame at $v$, and provided with a roller, L', at its lower end, which is in contact with a cam, M, on the shaft $c$. The upper end of the lever L is slotted, and passes over a pin, $u'$, on the the collar $u$. Consequently at each revolution of the shaft $c$ the bolt K is withdrawn from a notch K' in the table B, and after the passage of the full portion of the cam M from the roller L' the bolt K is again forced by the spring $t$ to the periphery of the table B, and in a position to enter the next notch K' therein.

The operation of the machine is as follows: The driving-shaft $c'$ being in revolution, a constant rotation of the can-seats is effected through the medium of the gearing before described, and the revoluble table is intermittingly moved and the cans successively brought to and held under the soldering devices, as above specified. Now, if a can is accidentally placed on a can-seat in a position deviating from a vertical one, which is often the case in the rapid manufacture of cans on machines of this class, one edge of the said can would be elevated, and in can-machines having rigid mouth-pieces to the solder-conducting tubes the can would strike the end of a mouth-piece and be thrown from its seat; but with my movable and self-righting nipples the can is not forced from its seat by the collision, but merely tripped by the nipples, which yield, and the can and nipples immediately assume their proper positions.

Heretofore the gas-flames used to melt the solder have been allowed to play on the solder-conducting tubes to heat them, and in consequence they were rapidly destroyed and had to be often renewed. In my invention the flames from the burners N (see Fig. I) play upon the removable nipples $g$, which, when burned, are easily replaced by new ones, the solder-conducting tubes remaining uninjured. Further, the nipples are made heavy, and with a knob at their end to retain the heat. After a can leaves the soldering devices it passes to a position under the fan H, and remains there while the next can is being soldered. The arrangement of the cam $o$ with reference to the lever I and its connections is such that upon the approach of the soldered can to a position underneath the fan the said fan is elevated, and while the can is stopped the full part of the cam $o$ passes the roller $p$ and the fan suddenly falls and continues to vibrate over the can by reason of the action of the spring $r$ on the end of the lever I, and the burning flux is extinguished.

I claim as my invention—

1. In a can-soldering machine, a vibratory fan, with means to effect its vibratory action to extinguish the flame from burning flux, substantially as specified.

2. In a can-soldering machine, the combination of solder-conducting tubes, removable and self-adjusting nipples, and burners, substantially as and for the purposes specified.

GEORGE T. PILLINGS.

Witnesses:
EDW. J. DIGGS,
DANL. FISHER.